United States Patent

Marshall et al.

[11] Patent Number: 5,690,049
[45] Date of Patent: Nov. 25, 1997

[54] COMPACT GAUGE ASSEMBLY

[75] Inventors: James E. Marshall, Southfield; Chandresekar R. Karur, Plymouth, both of Mich.

[73] Assignee: Ford Motor Company, Dearborn, Mich.

[21] Appl. No.: 596,810

[22] Filed: Feb. 5, 1996

[51] Int. Cl.⁶ .................................................. G01D 13/00
[52] U.S. Cl. ..................... 116/284; 116/288; 116/332; 116/DIG. 6; 116/DIG. 36
[58] Field of Search ................................. 116/284, 286, 116/287, 288, 298, 303, 305, 327, 328, 329, 330, 331, 332, DIG. 6, DIG. 36; 324/154 PB

[56] References Cited

U.S. PATENT DOCUMENTS

| | | | |
|---|---|---|---|
| 1,978,651 | 10/1934 | Shapiro et al. | 116/DIG. 6 X |
| 2,397,175 | 3/1946 | White | 116/287 X |
| 2,703,547 | 3/1955 | Hardesty . | |
| 3,216,394 | 11/1965 | Blackwell | 362/26 |
| 3,263,503 | 8/1966 | White . | |
| 3,490,226 | 1/1970 | Anderson et al. | 362/26 |
| 4,878,453 | 11/1989 | Inoue et al. | 116/288 |
| 5,259,333 | 11/1993 | Iino et al. | 116/286 |

FOREIGN PATENT DOCUMENTS

| | | |
|---|---|---|
| 492543-A1 | 7/1992 | European Pat. Off. . |
| 91451 | 2/1938 | Sweden ..................... 116/DIG. 6 |

Primary Examiner—William A. Cuchlinski, Jr.
Assistant Examiner—Willie Morris Worth
Attorney, Agent, or Firm—Lynn M. DaDamio

[57] ABSTRACT

A gauge assembly for a vehicle instrument cluster is provided. The gauge assembly includes a plate member and a pointer assembly that is rotatable relative to the plate member about a first axis. The pointer assembly includes a pointer cap having an internal surface and a pointer arm fixed relative to the cap. A driven surface is provided on at least a portion of the internal surface of the cap. The gauge assembly further includes a motor having a drive shaft. A driver is coupled to the drive shaft for drivingly engaging the driven surface of the pointer cap and rotating the pointer assembly.

20 Claims, 2 Drawing Sheets

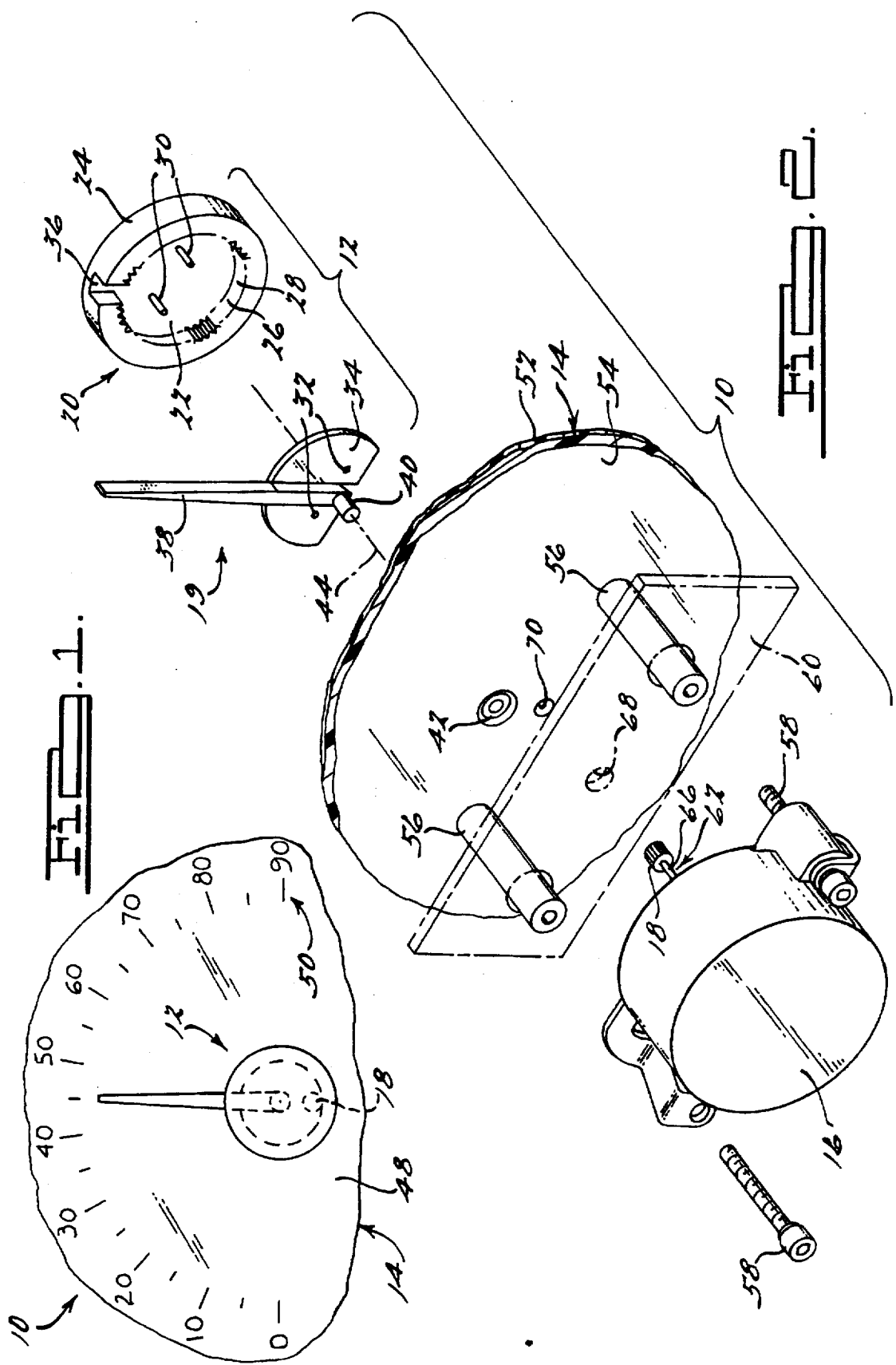

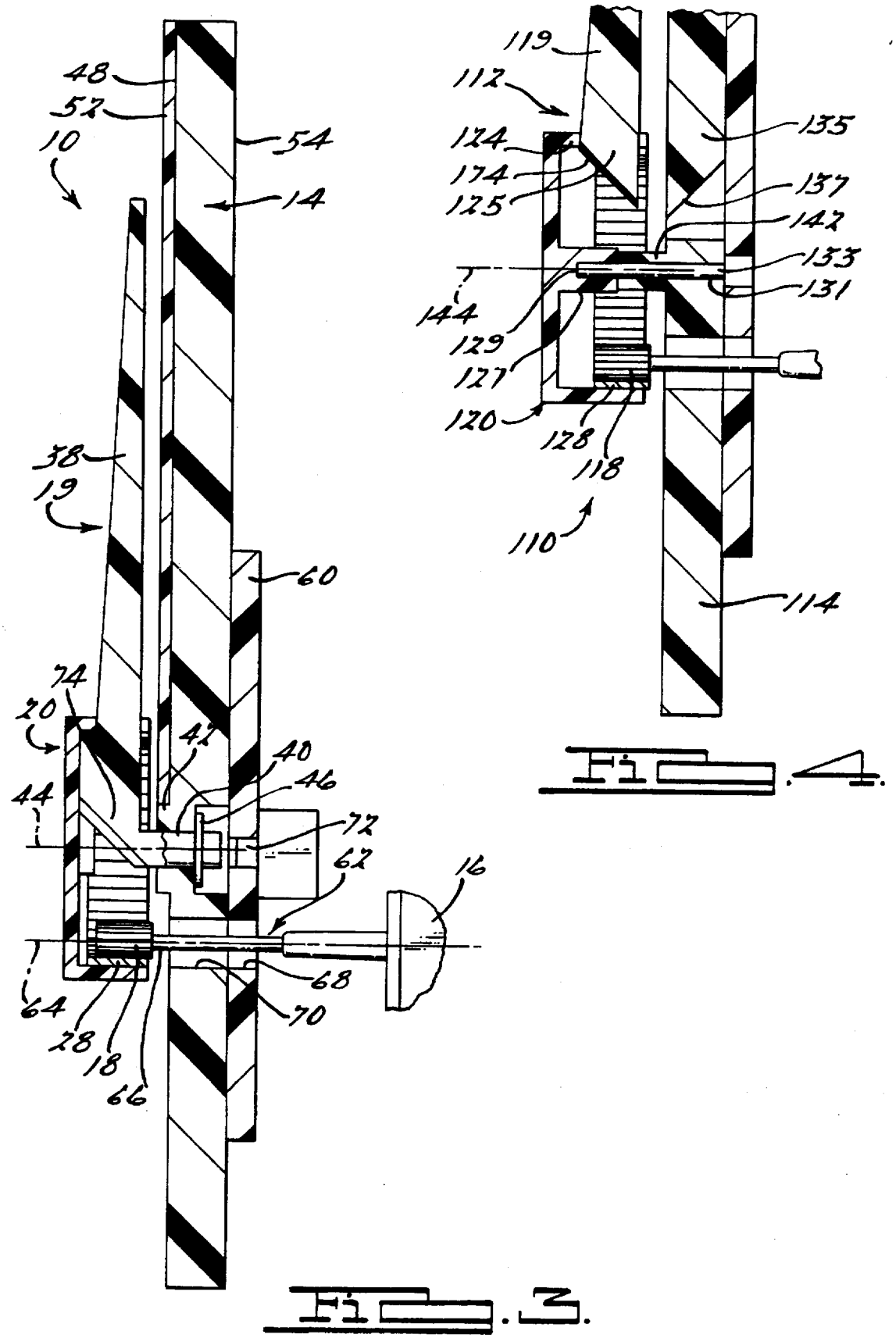

COMPACT GAUGE ASSEMBLY

BACKGROUND OF THE INVENTION

1. Field of the Invention

The present invention relates to a compact gauge assembly for use in a vehicle instrument cluster.

2. Description of Related Art

Instrument cluster gauges, such as the speedometers, tachometers, fuel and temperature gauges used in modern vehicles, typically include a rotatable pointer assembly coupled to a motor by a drive shaft. The drive shaft is commonly attached to a hub portion of the pointer assembly and thereby exerts a direct rotational force on the pointer assembly through the hub. The size of the gauge is largely determined by the size of the motor required to rotate the pointer assembly.

Given the space constraints of modern vehicles, gauge designers have sought to reduce the size of the instrument cluster by designing smaller, more compact gauges. One approach for reducing the depth of an instrument cluster gauge is disclosed in European patent application 492,543 (hereinafter EP 492,543). In the proposed design, the gauge includes a circular pointer plate having a light transmitting slit which serves as a pointer. An outer periphery of the pointer plate is provided with teeth for engaging a driving gear fixed to the drive shaft of the gauge motor. A discharge lamp and a reflector are installed behind the pointer plate to illuminate the light transmitting slit. In earlier gauge designs described in EP 492,543, the gauge motor is centrally located behind the pointer plate and reflector to accommodate the driving of the center portion of the pointer plate. In the proposed EP 492,543 design, the gauge motor is instead located underneath or alongside the reflector to drive the outer periphery of the pointer plate. By repositioning the motor in this fashion, a shorter drive shaft is used to couple the pointer plate to the motor, and the depth of the gauge is thereby reduced. In addition, by using a driving gear to drive the outer periphery of the pointer plate, the amount of torque required to rotate the pointer plate is less than if the drive shaft were used to drive the center portion of the pointer plate.

While reducing the depth and torque requirements of an instrument gauge are desirable design objects, there are several drawbacks to the gauge design proposed in EP 492,543. One such drawback is that in repositioning the motor underneath or alongside the reflector, the height or width of the gauge is increased. Another drawback of the design is that no provision is made within the gauge itself to cover or conceal the toothed portions of the pointer plate and the driving gear from the occupants of the vehicle.

SUMMARY OF THE INVENTION

The present invention provides an instrument cluster gauge assembly which overcomes the above-described drawbacks of the prior art. The gauge assembly includes a plate member and a pointer assembly that is rotatable relative to the plate member about a first axis. The pointer assembly includes a pointer cap and a pointer fixed relative to the pointer cap. The pointer cap has an internal surface, at least a portion of which comprises a driven surface. The gauge assembly further includes a motor having a drive shaft. A driver is coupled to the drive shaft for drivingly engaging the driven surface of the pointer cap and rotating the pointer assembly.

According to one aspect of the present invention, the driven surface of the pointer cap comprises an internally toothed ring gear, and the driver comprises a pinion that meshingly engages the ring gear.

It is an advantage of the present invention to provide a gauge assembly having a gear reduction mechanism for reducing the required torque output of the motor and thereby the required size of the motor.

It is a further advantage of the present invention to provide a compact gauge assembly having a neat appearance.

By providing the driven surface of the assembly on an internal surface of the pointer cap, both the driver and the driven surface of the assembly are neatly concealed from the occupants of the vehicle without the need for a separate cover or mask. Furthermore, by providing the driven surface of the gauge assembly on the internal surface of the pointer cap, the depth of the gauge may be reduced without increasing either the height or the width of the gauge.

These and other features and advantages of the present invention will be more fully described below with reference to the following detailed description and drawings.

BRIEF DESCRIPTION OF THE DRAWINGS

FIG. 1 is a front elevational view of an instrument cluster gauge assembly according to the present invention.

FIG. 2 is an exploded perspective view of the gauge assembly of FIG. 1.

FIG. 3 is a partial cross-sectional view of the gauge assembly of FIG. 1.

FIG. 4 is a partial cross-sectional view of an alternative embodiment of a gauge assembly according to the present invention.

DETAILED DESCRIPTION OF THE PREFERRED EMBODIMENTS

Referring now to the drawings, and in particular to FIGS. 1–3 thereof, an instrument cluster gauge assembly 10 is illustrated as comprising a pointer assembly 12 rotatable relative to a dial plate member 14, and a motor 16 coupled to a driver 18 for engaging the pointer assembly 12 and causing rotation thereof. For illustration purposes, gauge assembly 10 is depicted in FIG. 1 as a speedometer, though those skilled in the instrumentation arts will understand that the gauge assembly 10 of the present invention may be adapted to various other uses, including, for example, use as a tachometer, fuel gauge or temperature gauge.

As best illustrated in FIG. 2, pointer assembly 12 includes a pointer 19 engagable with a pointer cap 20. Pointer cap 20 has a generally circular end wall 22 and a generally cylindrical side wall 24. Side wall 24 defines an internal surface 26, at least a portion of which comprises an internally toothed ring gear 28. Ring gear 28 is preferably integrally formed as a part of side wall 24. Alternatively, however, ring gear 28 may be separately attached to side wall 24. Pointer cap 20 is preferably made of an opaque plastic material, such as polycarbonate or acrylonitrile-butadiene-styrene terpolymer (ABS), such that ring gear 28 is not visible through walls 22, 24. Pointer 19 may be attached to pointer cap 20 in conventional fashion by passing locating pins 30 on end wall 22 of pointer cap 20 through apertures 32 in base portion 34 of pointer 19. Pins 30 are then preferably heat staked to base portion 34. A notch 36 is provided in side wall 24 of pointer cap 20 to accommodate pointer arm 38 of pointer 19. Pointer 19 is preferably positioned relative to pointer cap 20 such that a generally cylindrical hub portion 40 of pointer 19 extends generally perpendicularly away from the center of end wall 22.

Dial plate member 14 is positioned behind pointer assembly 12 and includes a bearing boss 42 for receiving hub portion 40 therethrough. Boss 42 is sized such that hub portion 40 is rotatable relative to plate member 14 about longitudinal axis 44 of hub portion 40 (see FIG. 3). A retainer, such as compression ring 46, may be used to secure hub portion 40 to plate member 14 without inhibiting the rotational movement thereof. The front face 48 of plate member 14 is provided with a graduated display portion 50, which may be printed directly on plate member 14 or attached thereto through an appliqué 52 (see FIGS. 1 and 3). The back face 54 of plate member 14 includes a pair of mounting bosses 56 to which motor 16 may be secured in conventional fashion with fasteners 58.

Motor 16 is preferably a cross-coil type, air core motor well-known to those skilled in the vehicle instrumentation arts. Motor 16 receives control signals from a microprocessor (not shown) mounted on circuit board 60. During operation of the vehicle, these control signals cause drive shaft 62 of motor 16 to rotate about an axis 64. As illustrated in FIG. 3, axis 64 is remote from and generally parallel to axis 44.

Driver 18 is fixedly mounted to one end 66 of drive shaft 62 and thereby rotates together with shaft 62 in response to signals sent by the microprocessor. Driver 18, which is depicted in the preferred embodiments as a pinion gear, extends through clearance openings 68, 70 in circuit board 60 and plate member 14, respectively, to a position in front of plate member 14, where it meshingly engages ring gear 28. As driver 18 rotates about axis 64, it therefore drives ring gear 28, causing pointer assembly 12 to rotate about axis 44. The gear drive ratio of ring gear 28 to pinion driver 18 preferably ranges from about 7:1 to about 9:1, and is most preferably about 8:1 for a gauge assembly 10 having a standard-sized pointer cap 20 with an outer diameter of about 2 cm. The above-described gear reduction mechanism makes possible the use of a relatively small motor 16 for rotating pointer assembly 12 and enables available instrument cluster space to be used in a highly efficient manner. The gear reduction mechanism also provides mechanical damping of pointer assembly 12, reducing the need for damping fluid to be used within motor 16. Driver 18 is preferably made of a plastic material, such as nylon. It is desirable that the material selected for driver 18 is different from the material selected for ring gear 28 so as to minimize noise generated by the movement of the components against one another.

Various lighting techniques may be used to advantage with the present invention, including both backlighting and floodlighting techniques. One preferred backlighting system is illustrated in FIG. 3. As depicted therein, a light source, such as light emitting diode 72, is positioned on circuit board 60 so as to illuminate hub portion 40 of pointer 19. Pointer 19, including hub portion 40 thereof, is made of acrylic or optical grade polycarbonate so as to readily transfer light therethrough. A light reflector, such as light prism 74, is interposed between hub portion 40 and pointer arm 38 for redirecting light from hub portion 40 up through pointer arm 38.

With reference now to FIG. 4, an alternative embodiment of a gauge assembly 110 according to the present invention is shown. Gauge assembly 110 is substantially similar to the gauge assembly 10 described above except in the provision of a modified pointer assembly 112 and a modified dial plate member 114. Pointer assembly 112 comprises a pointer 119 engagable with a pointer cap 120. Pointer 119 is secured to side wall 124 of pointer cap 120, and has an end 125 which extends inward from side wall 124 towards the center of pointer cap 120. As illustrated, end 125 of pointer 119 preferably includes a light reflector 174. Pointer cap 120 includes a central boss 127 having a blind opening 129 therein. Opening 129 is aligned with a bore 131 in bearing boss 142 of dial plate member 114. A connecting pin 133 rotatably extending through bore 131 is received in press-fit relationship within opening 129 of pointer cap 120. Thus, when driver 118 drives driven surface 128 of pointer cap 120, pointer assembly 112 rotates relative to dial plate member 114 about an axis 144 defined by pin 133. The lighting of pointer 119 is accomplished by positioning a light source (not shown) so as to transmit light through a portion 135 of dial plate member 114. A light reflector 137 provided in plate member 114 directs the light onto light reflector 174 of pointer 119. Light reflector 174 is positioned so as to redirect the light throughout the remainder of pointer 119.

While the invention has been shown and described in its preferred embodiments, it will be clear to those skilled in the arts to which it pertains that many changes and modifications may be made thereto without departing from the scope of the invention. Modifications which fall within the true scope of this invention are intended to be included within the terms of the appended claims.

What is claimed is:

1. An instrument cluster gauge assembly, comprising:
   a plate member;
   a pointer assembly rotatable relative to said plate member about a first axis;
   said pointer assembly including:
      a pointer cap having an internal surface,
      a driven surface on at least a portion of said internal surface, and
      a pointer fixed relative to said pointer cap;
   a motor having a drive shaft; and
   a driver coupled to said drive shaft for drivingly engaging said driven surface and rotating said pointer assembly.

2. A gauge assembly according to claim 1, wherein said driven surface comprises an internally toothed ring gear and said driver comprises a pinion that meshingly engages said ring gear.

3. A gauge assembly according to claim 2, wherein the gear drive ratio of said ring gear to said pinion is between about 7:1 and about 9:1.

4. A gauge assembly according to claim 3, wherein said gear drive ratio is about 8:1.

5. A gauge assembly according to claim 1, wherein said drive shaft extends along a second axis remote from and parallel to said first axis.

6. A gauge assembly according to claim 1, wherein said motor is positioned behind said plate member and said driver extends through said plate member to engage said driven surface.

7. A gauge assembly according to claim 1, wherein said first axis is defined by a hub portion of said pointer assembly.

8. A gauge assembly according to claim 7, wherein said plate member further includes a bearing boss and said hub portion is rotatably received in said bearing boss for rotation about said first axis.

9. A gauge assembly according to claim 8, wherein said pointer assembly further comprises a pointer arm connected to said hub portion, and said gauge assembly further comprises a light source and a light reflector for directing light from said light source to illuminate said pointer arm.

10. A gauge assembly according to claim 9, wherein said light reflector comprises a light prism interposed between said hub portion and said pointer arm of said pointer assembly.

11. An instrument cluster gauge assembly, comprising:
a plate member;
a pointer assembly rotatable relative to said plate member about a first axis;
said pointer assembly including:
   a pointer cap having an internal surface,
   a driven surface on at least a portion of said internal surface, said driven surface comprising an internally toothed ring gear, and
   a pointer fixed relative to said pointer cap;
a motor having a drive shaft extending along a second axis remote from and parallel to said first axis; and
a pinion coupled to said drive shaft for drivingly engaging said driven surface and rotating said pointer assembly.

12. A gauge assembly according to claim 11, wherein the gear drive ratio of said ring gear to said pinion is between about 7:1 and about 9:1.

13. A gauge assembly according to claim 12, wherein said gear drive ratio is about 8:1.

14. A gauge assembly according to claim 11, wherein said motor is positioned behind said plate member and said pinion extends through said plate member to engage said driven surface.

15. A gauge assembly according to claim 11, wherein said first axis is defined by a hub portion of said pointer assembly.

16. A gauge assembly according to claim 15, wherein said plate member further includes a bearing boss and said hub portion is rotatably received in said bearing boss for rotation about said first axis.

17. A gauge assembly according to claim 16, wherein said pointer assembly further comprises a pointer arm connected to said hub portion, and said gauge assembly further comprises a light source and a light reflector for directing light from said light source to illuminate said pointer arm.

18. A gauge assembly according to claim 17, wherein said light reflector comprises a light prism interposed between said hub portion and said pointer arm of said pointer assembly.

19. An instrument cluster gauge assembly, comprising:
a plate member;
a pointer assembly rotatable relative to said plate member about a first axis;
said pointer assembly including:
   a pointer cap having an internal surface,
   a driven surface on at least a portion of said internal surface, said driven surface comprising an internally toothed ring gear, and
   a pointer fixed relative to said pointer cap;
a motor positioned behind said plate member and having a drive shaft extending through said plate member along a second axis remote from and parallel to said first axis; and
a pinion coupled to said drive shaft for drivingly engaging said driven surface and rotating said pointer assembly, wherein the gear drive ratio of said ring gear to said pinion is between about 7:1 and about 9:1.

20. A gauge assembly according to claim 19, wherein said gear drive ratio is about 8:1.

* * * * *